United States Patent
Song

(10) Patent No.: US 10,191,312 B2
(45) Date of Patent: Jan. 29, 2019

(54) RUBBER FRAME COMPONENT, BACKLIGHT MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Yong Song, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 15/021,848

(22) PCT Filed: Sep. 30, 2015

(86) PCT No.: PCT/CN2015/091166
§ 371 (c)(1),
(2) Date: Mar. 14, 2016

(87) PCT Pub. No.: WO2016/192261
PCT Pub. Date: Dec. 8, 2016

(65) Prior Publication Data
US 2017/0131580 A1 May 11, 2017

(30) Foreign Application Priority Data
Jun. 5, 2015 (CN) .................... 2015 2 0384057 U

(51) Int. Cl.
*G02F 1/1333* (2006.01)
*G02F 1/1335* (2006.01)

(52) U.S. Cl.
CPC ...... *G02F 1/1333* (2013.01); *G02F 1/133308* (2013.01); *G02F 1/133608* (2013.01);
(Continued)

(58) Field of Classification Search
None
See application file for complete search history.

(56) References Cited

U.S. PATENT DOCUMENTS 7,492,422 B2    2/2009   Park et al.

FOREIGN PATENT DOCUMENTS

| CN | 1619366 A | 5/2005 |
| CN | 101349837 A | 1/2009 |

(Continued)

OTHER PUBLICATIONS

Zhan, CN 203930270 U (machine translation).*

(Continued)

*Primary Examiner* — Kristy A Haupt
(74) *Attorney, Agent, or Firm* — Collard & Roe, P.C.

(57) ABSTRACT

A rubber frame component, a backlight module, and a display device are provided, and the rubber frame component includes a rubber frame body and pointy projections made of a metal; the rubber frame body is configured to surround the edges of the backlight module and fix the backlight module; the pointy projections made of a metal are used to attract the static charges in a periphery of the display panel. The pointy projections made of a metal in the rubber frame component can attract the static charges around the display panel and discharge the electrostatic.

20 Claims, 2 Drawing Sheets

(52) U.S. Cl.
CPC ............ *G02F 2001/133314* (2013.01); *G02F 2201/503* (2013.01); *G02F 2202/22* (2013.01)

(56) References Cited

FOREIGN PATENT DOCUMENTS

| | | |
|---|---|---|
| CN | 203930270 U | 11/2014 |
| CN | 204631409 U | 9/2015 |
| JP | 2005-077590 A | 3/2005 |

OTHER PUBLICATIONS

Park, CN 1619366 (machine translation).*
International Search Report of PCT/CN2015/091166 in Chinese, dated Jan. 18, 2016 with English translation.
Notice of Transmittal of the International Search Report of PCT/CN2015/091166 in Chinese, dated Jan. 18, 2016.
Written Opinion of the International Searching Authority of PCT/CN2015/091166 in Chinese, dated Jan. 18, 2016 with English translation.
International Search Report of PCT/CN2015/091166 in Chinese, dated Jan. 18, 2015 with English translation.
Notice of Transmittal of the International Search Report of PCT/CN2015/091166 in Chinese, dated Jan. 18, 2015.
Written Opinion of the International Searching Authority of PCT/CN2015/091166 in Chinese, dated Jan. 18, 2015 with English translation.

* cited by examiner

RUBBER FRAME COMPONENT, BACKLIGHT MODULE AND DISPLAY DEVICE

CROSS REFERENCE TO RELATED APPLICATIONS

This application is the National Stage of PCT/CN2015/091166 filed on Sep. 30, 2015, which claims priority under 35 U.S.C. § 119 of Chinese Application No. 201520384057.6 filed on Jun. 5, 2015, the disclosure of which is incorporated by reference.

TECHNICAL FIELD

At least one embodiment of the present disclosure provides a rubber frame component, a backlight module, and a display device.

BACKGROUND

Liquid crystal display devices are widely used because they have the advantages such as thin profile, low power consumption, no radiation, etc. At present, most of liquid crystal display devices include a display panel and a backlight module disposed on the back side of the display panel, the backlight module is used for providing a uniform light source for the display panel, so that the display panel is capable of displaying images normally. The backlight module usually includes a light source, a light guide plate, a reflection piece, a rubber frame, and so on.

SUMMARY

At least one embodiment of the present disclosure provides a rubber frame component, a backlight module, and a display device to improve the antistatic ability of a display device.

At least one embodiment of the present disclosure provides a rubber frame component, the rubber frame component includes: a rubber frame body for surrounding edges of a backlight module and fixing the backlight module; pointy projections made of a metal for attracting static charges in a periphery of a display panel.

At least one embodiment of the present disclosure further provides another rubber frame component, the rubber frame component includes: a rubber frame body for surrounding edges of a backlight module and fixing the backlight module; and pointy projections made of a material which comprises a conductive material for attracting static charges in a periphery of a display panel.

At least one embodiment of the present disclosure further provides a display device, and the display device includes a display panel, a backlight module and any above rubber frame component.

At least one embodiment of the present disclosure further provides a backlight module, and the backlight module includes any above rubber frame component.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
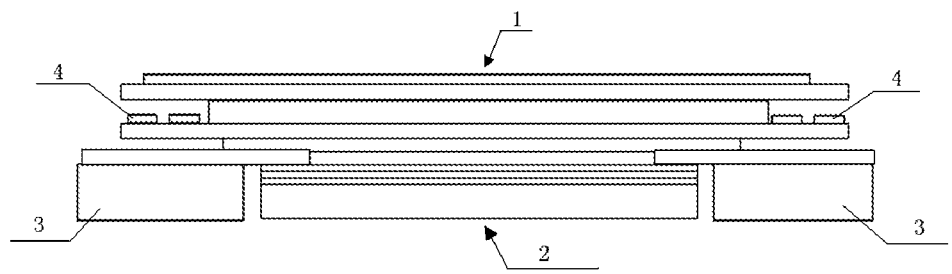
FIG. 1 is a structure schematic view of a rubber frame used in a display device.
Figure 2:
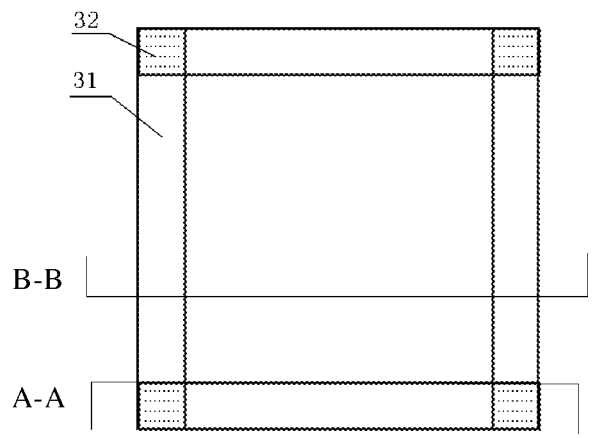
FIG. 2 is a top schematic view of a rubber frame component in a second embodiment of the present disclosure.

Reference numerals: 1—display panel; 2—backlight module; 3—rubber frame component; 31—rubber frame body; 32—pointy projection made of a metal; 33—reinforcing part; 331—supporting unit; 332—reinforcing unit; 4—lead.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In study, the inventor of the present application have noted that, as shown in FIG. 1, a current liquid crystal display device usually includes a display panel 1, a backlight module 2, and a rubber frame component 3 surrounding edges of the backlight module 2 and fixing the backlight module 2. With the constantly development of the production technology of liquid crystal display devices, in order to better achieve a narrow bezel and thin-profile design, the metal backboard used for supporting the backlight is omitted from the backlight module, which expands the viewing area of a product and improves the utilization rate of the product, but because the frame of the product is too narrow, the surrounding leads 4 of the display panel 1 are too tight and too close to the edge of the display panel 1 in design. Because static charges are close to the surrounding leads 4 of the display panel 1, in the case that the product suffers from static charges, such a design causes the static charges easy to enter the internal of the display panel 1 and burn down the leads 4 in the internal of the display panel 1.

The inventor has noted that the configuration as shown in FIG. 1 at least has the following problems: the antistatic ability of a liquid crystal display device is weak, which limits the use of a liquid crystal display device product.

At least one embodiment of the present disclosure provides a rubber frame component, a backlight module, and a display device, and the rubber frame component includes: a rubber frame body for surrounding edges of a backlight module and fixing the rubber frame body of the backlight module, and pointy projections are configured for attracting static charges in a periphery of a display panel, the pointy projections are made of a material which includes a conductive material. For example, the conductive material of the forming material of the pointy projections includes a metal or a conductive metal oxide (for example indium tin oxide etc.), as long as it is a conductive material.

The embodiments of the disclosure use pointy projections made of a conductive material (for example a metal) to attract static charges around the display panel. If the rubber frame is applied to a display device, in the case that the display device suffers from static charges in its periphery, the static charges arrive at the pointy projections made of a metal firstly, and the pointy projections discharge the static charges.

For example, a reinforcing part is disposed in the rubber frame component to avoid the problem of poor impact resistant ability of a display panel.

The rubber frame components provided by the embodiments of the present disclosure are suitable for all kinds of display devices and especially suitable for a liquid crystal display device.

Below in conjunction with the accompany drawings, detailed explanation is give to the rubber frame component, the backlight module, and the display device provided by the embodiments of the present disclosure.

At least one embodiment of the present disclosure provides a rubber frame component 3, as shown in FIGS. 2 to 5, the rubber frame component 3 includes a rubber frame body 31 and pointy projections 32 made of a metal, the rubber frame body 31 is configured to surround the edges 21 of the backlight module 2 and fix the backlight module 2, and the pointy projections 32 made of a metal are configured to attract static charges around the display panel 1.

That is to say, in order to improve the antistatic ability of a display device, the embodiments of the disclosure have introduced improvement to the rubber frame component 3, the pointy projections 32 made of a metal are disposed in the rubber frame component 3, so in the case that the display device suffers from the static charges, the static charges arrive at the pointy projections made of a metal firstly, and the pointy projections made of a metal dissipates the static charges.

Figure 3:
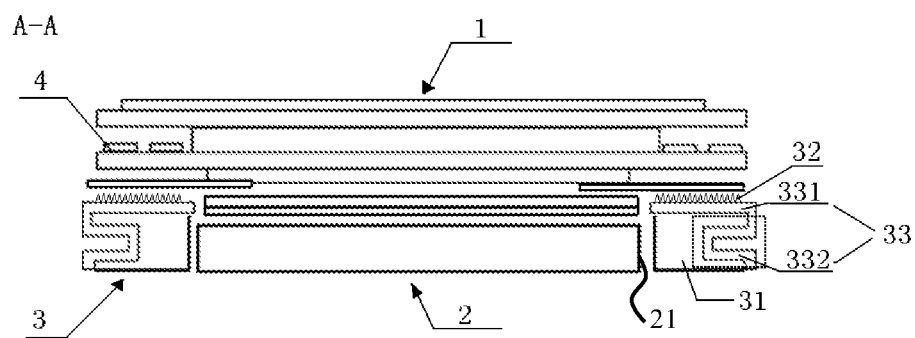
FIG. 3 is a sectional schematic view of a rubber frame component in the second embodiment of the present disclosure used in a display device.
Figure 4:
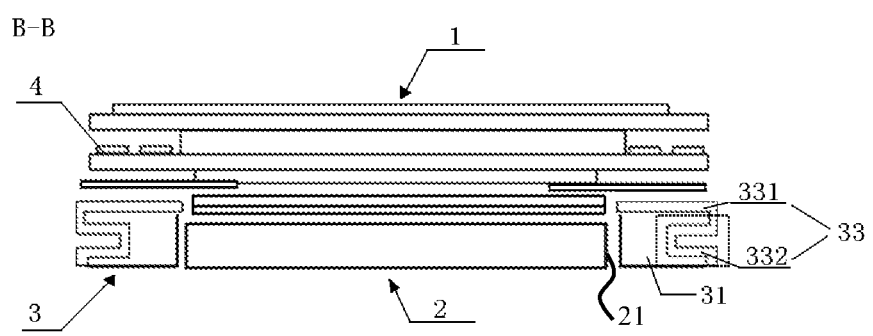
FIG. 4 is another sectional view of a rubber frame component in the second embodiment of the present disclosure used in a display device.

For example, as shown in FIG. 3 and FIG. 4, the edge area of the display panel 1 is provided with leads 4, the pointy projections 32 made of a metal are disposed on the rubber frame body 31 at positions corresponding to the leads 4. That is to say, the leads 4 are usually disposed in the edges and corners (the region of the angles between the edges) of the display panel 1. The pointy projections 32 made of a metal are disposed on the rubber frame body 31 at positions close to the leads 4 in the embodiments of the disclosure, and this configuration is more beneficial to antistatic.

For example, the pointy projections 32 made of a metal are projected perpendicular to the display panel 1. It is beneficial for the pointy projections 32 to attract static charges in the periphery of the display panel 1.

For example, the rubber frame component 3 further includes a reinforcing part 33, the reinforcing part 33 is disposed in the rubber frame body 31 (as shown in FIG. 3 and FIG. 4, a part of the reinforcing part 33 is disposed in the rubber frame body 31), and it is used to support the display panel 1, the pointy projections 32 made of a metal are disposed on the reinforcing part 33 (as shown the dotted-lines in FIG. 3 and FIG. 4) at a side close to the display panel 1.

The substrate of the liquid crystal display panel is usually made of a glass material, because the fragility of the glass material, if collision or vibrate happens to the liquid crystal display device in transportation or use, the impact resistant ability of the liquid crystal display panel is very poor. Disposing the reinforcing part 33 in the rubber frame component 3 can solve the problem of the poor impact resistant ability of the liquid crystal display panel 1 in the embodiments of the present disclosure.

For example, the reinforcing part 33 includes an reinforcing unit 332 that is perpendicular to the display panel 1 and a supporting unit 331 that is parallel to the display panel, the supporting unit 331 is connected to the reinforcing unit 332 at a side close to the display panel 1, and the pointy projections 32 made of a metal are disposed on a surface of the supporting unit 331 at a side close to the display panel 1.

That is to say, the reinforcing part 33 can be divided into two parts, one part being configured to support the above display panel 1 and the other part being configured to enhance the supporting force. With this design, if collision happens to the display panel 1, the reinforcing part 33 plays a role of buffering and at the same time can prevent the backlight module 2 from being crushed.

For example, the reinforcing unit 332 is a stiffener (reinforcing rib), and the stiffeners are configured to surround the backlight module 2.

That is to say, the stiffeners are provided around the backlight module 2 in a circle, and of course, in order to reduce the consumption of the raw material, the stiffeners can only be disposed at several positions of the rubber frame body 31.

For example, the longitudinal section of a stiffener has at least one bend.

Figure 5:
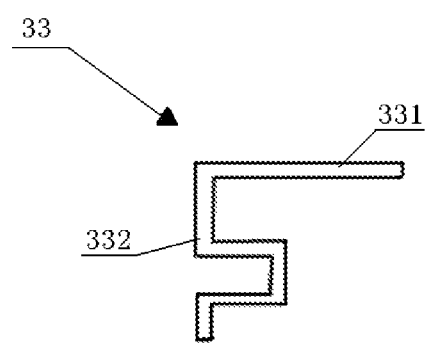
FIG. 5 is a schematic view of a reinforcing part of a rubber frame component in the second embodiment of the present disclosure.

That is to say, as shown in FIG. 5, the longitudinal section of the stiffener can be designed in, for example, a shape of "Σ", to improve the buffering capacity of the stiffener.

For example, the reinforcing part 33 is made of a material which includes a metal. In this case, for example, the reinforcing part 33 and the pointy projections 32 made of a metal are integrally formed.

That is to say, both the reinforcing part 33 and the pointy projections 32 made of a metal are made of the metal, and they are integrally formed. In this design, before injection molding the rubber frame body 31, the integrally formed reinforcing part 33 and pointy projections 32 made of a metal are placed at an appropriate position within the raw material of the rubber frame body 31, after raw material of the rubber frame body 31 is cooled after injection, both the reinforcing part 33 and the pointy projections 32 made of a metal are fixed in the rubber frame component 3. Installing the rubber frame component 3 in a display device can be completed in one step.

Obviously, the particular implementation methods of each embodiment can have many modifications; for example: the longitudinal section of the stiffener is designed in an "I-shape" or the pointy projections 32 made of a metal are disposed on the side surface of the rubber frame and parallel to the direction of the display panel, and these modifications can achieve the same effect.

At least one embodiment of the present disclosure provides a display device, and the display device includes a display panel, a backlight module and a rubber frame component according to any one of the above.

For example, the display device can be: a liquid crystal panel, an electronic paper, a mobile phone, a tablet computer, a television, a display, a notebook computer, a digital picture frame, a navigation system and any other product or component having a display function.

At least one embodiment of the present disclosure further provides a backlight module, and the backlight module includes a rubber frame component according to any one embodiment above. The setting of the rubber frame can refer to the above-mentioned embodiments, and the redundant description will be omitted herein.

Of course, the backlight module further includes the components such as a light source, a light guide plate, a reflection piece, or the like.

The rubber frame component, the backlight module, and the display device provided by the embodiments of the present disclosure comprise pointy projections made of a metal to attract the static charges in the periphery of the display panel. If the rubber frame is applied to a display device, in the case that the display device suffers from static charges, the static charges arrive at the pointy projections made of a metal firstly, and the pointy projections discharge the static charges. For example, a reinforcing part is disposed in the rubber frame component to solve the problem of poor impact resistant ability of a liquid crystal display panel. The rubber frame component and the backlight module provided by the embodiments of the present disclosure are suitable for all types of display devices and especially suitable for liquid crystal display devices.

What are described above is related to the illustrative embodiments of the disclosure only and not limitative to the scope of the disclosure; the scopes of the disclosure are defined by the accompanying claims.

The present application claims the priority of the Chinese Patent Application No. 201520384057.6 filed on Jun. 5, 2015, which is incorporated herein by reference as part of the disclosure of the present application.

The invention claimed is:

1. A rubber frame component, comprising:
    a rubber frame body for surrounding edges of a backlight module and fixing the backlight module;
    pointy projections made of a metal for attracting static charges in a periphery of a display panel; and
    a reinforcing part disposed in the rubber frame body for supporting the display panel.

2. The rubber frame component according to claim 1, wherein an edge area of the display panel is provided with leads, and the pointy projections made of a metal are disposed on the rubber frame body at positions corresponding to the leads.

3. The rubber frame component according to claim 2, wherein the pointy projections made of a metal are disposed on the reinforcing part at a side close to the display panel.

4. The rubber frame component according to claim 3, wherein the reinforcing part comprises an reinforcing unit that is perpendicular to the display panel and a supporting unit that is parallel to the display panel, the supporting unit is connected to the reinforcing unit at the side close to the display panel, and the pointy projections made of a metal are disposed on a surface of the supporting unit at the side close to the display panel.

5. The rubber frame component according to claim 3, wherein the reinforcing unit is a stiffener, and the stiffener is configured to surround the backlight module.

6. The rubber frame component according to claim 5, wherein the longitudinal section of the stiffener has at least one bend.

7. The rubber frame component according to claim 3, wherein the reinforcing part is made of a material which comprises a metal.

8. The rubber frame component according to claim 7, wherein the reinforcing part and the pointy projections made of a metal are integrally formed.

9. The rubber frame component according to claim 1, wherein the pointy projections made of a metal are perpendicular to the display panel.

10. The rubber frame component according to claim 1, wherein the pointy projections made of a metal are disposed on the reinforcing part at a side close to the display panel.

11. The rubber frame component according to claim 10, wherein the reinforcing part comprises an reinforcing unit that is perpendicular to the display panel and a supporting unit that is parallel to the display panel, the supporting unit is connected to the reinforcing unit at the side close to the display panel, and the pointy projections made of a metal are disposed on a surface of the supporting unit at the side close to the display panel.

12. The rubber frame component according to claim 10, wherein the reinforcing unit is a stiffener, and the stiffener is configured to surround the backlight module.

13. The rubber frame component according to claim 12, wherein the longitudinal section of the stiffener has at least one bend.

14. The rubber frame component according to claim 10, wherein the reinforcing part is made of a material which comprises a metal.

15. The rubber frame component according to claim 14, wherein the reinforcing part and the pointy projections made of a metal are integrally formed.

16. A display device, comprising a display panel, a backlight module and a rubber frame component according to claim 1.

17. A backlight module, comprising a rubber frame component according to claim 1.

18. A rubber frame component, comprising:
    a rubber frame body for surrounding edges of a backlight module and fixing the backlight module;
    pointy projections made of a material which comprises a conductive material for attracting static charges in a periphery of a display panel; and
    a reinforcing part disposed in the rubber frame body for supporting the display panel.

19. A display device, comprising a display panel, a backlight module and a rubber frame component according to claim 18.

20. A backlight module, comprising a rubber frame component according to claim 18.

* * * * *